Dec. 29, 1942.   C. R. PALMER ET AL   2,306,995
METHOD OF MAKING CAPILLARY TUBES AND THE LIKE
Filed June 2, 1939   3 Sheets-Sheet 1
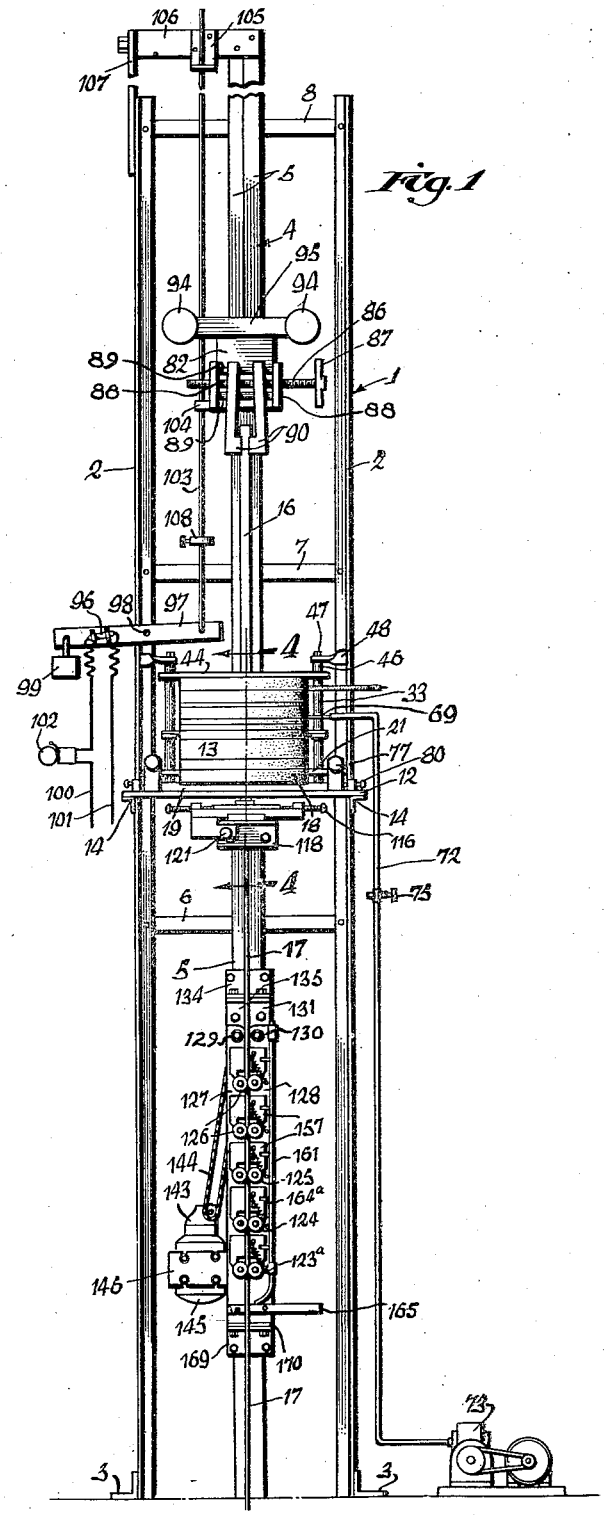
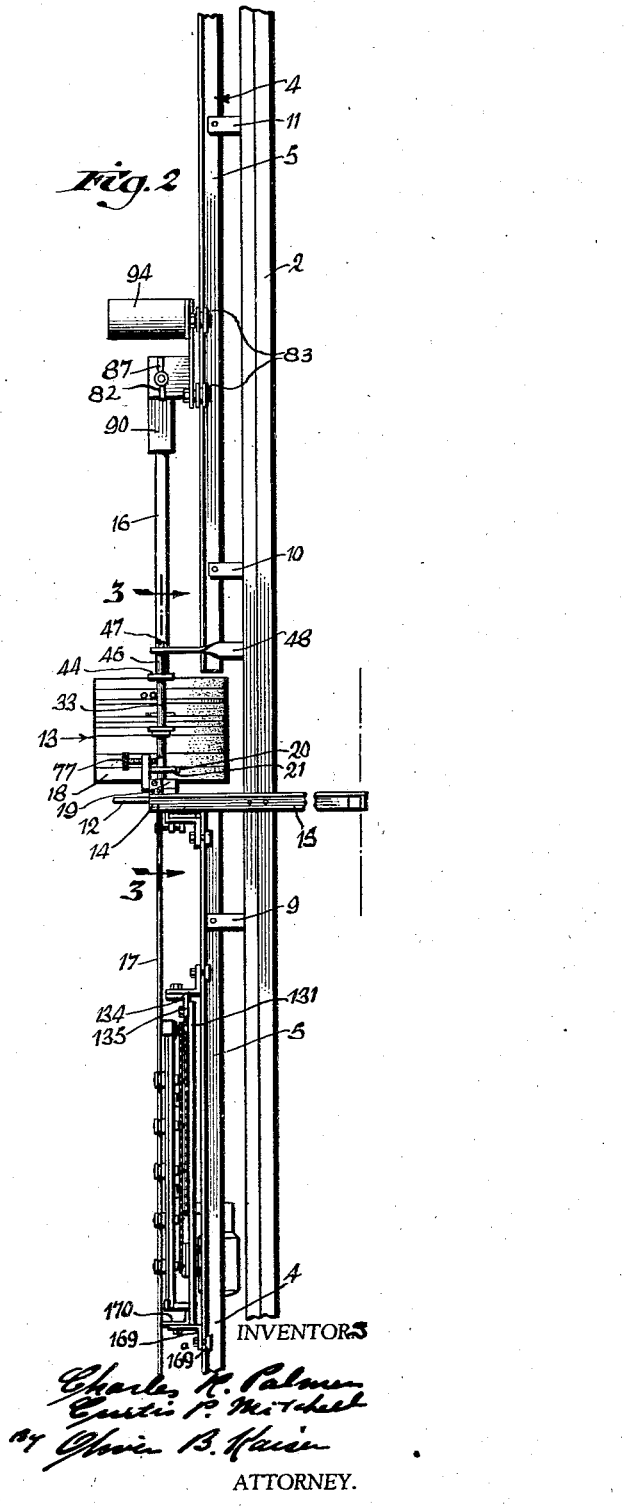
INVENTORS
Charles R. Palmer
Curtis P. Mitchell
BY Olivier B. Kaiser
ATTORNEY.

Dec. 29, 1942. C. R. PALMER ET AL 2,306,995
METHOD OF MAKING CAPILLARY TUBES AND THE LIKE
Filed June 2, 1939   3 Sheets-Sheet 2
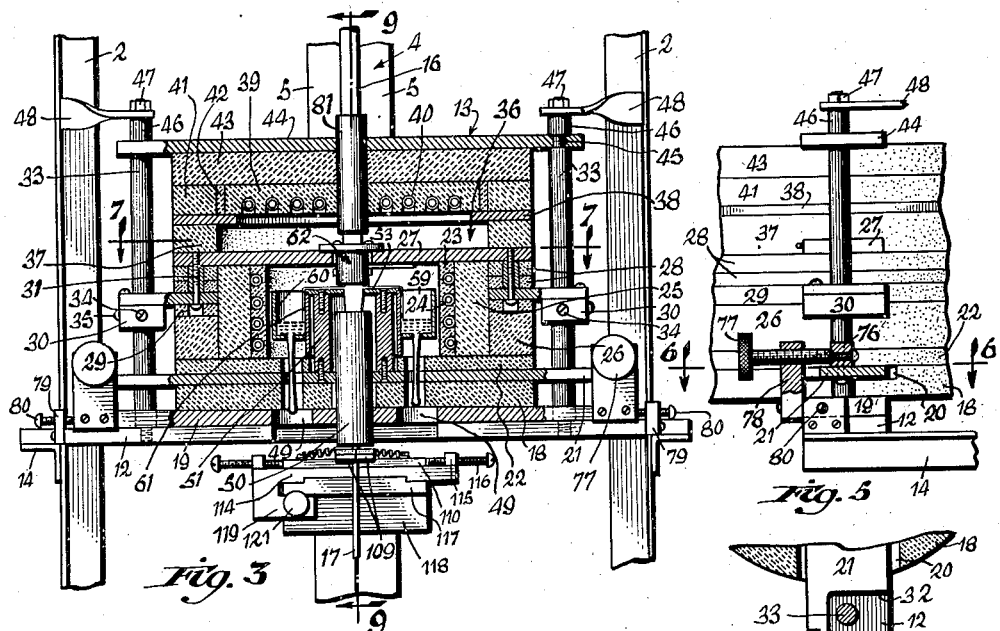
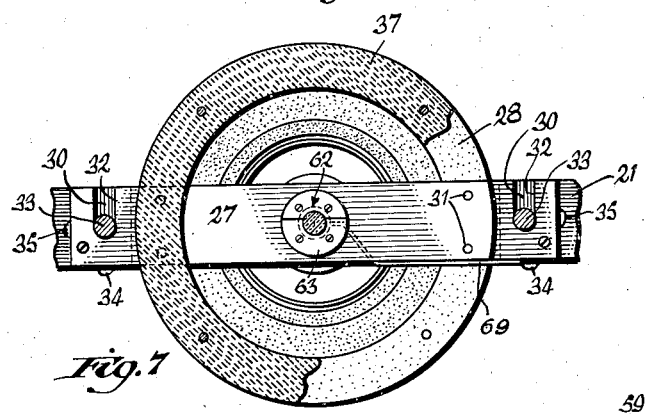
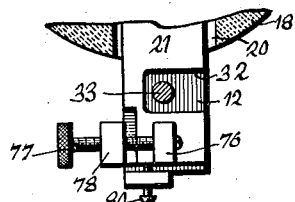
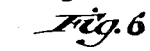
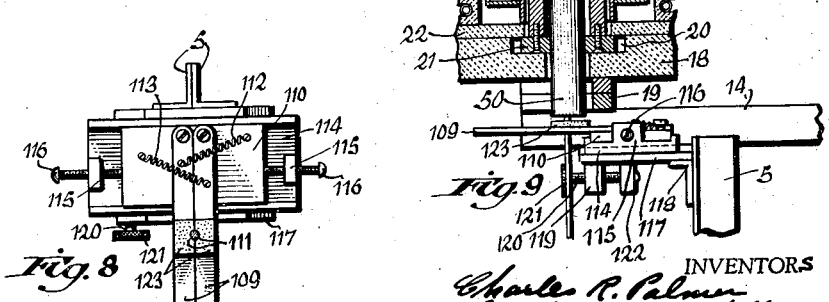
INVENTORS
Charles R. Palmer
Curtis P. Mitchell
Olivia B. Kaiser
BY
ATTORNEY.

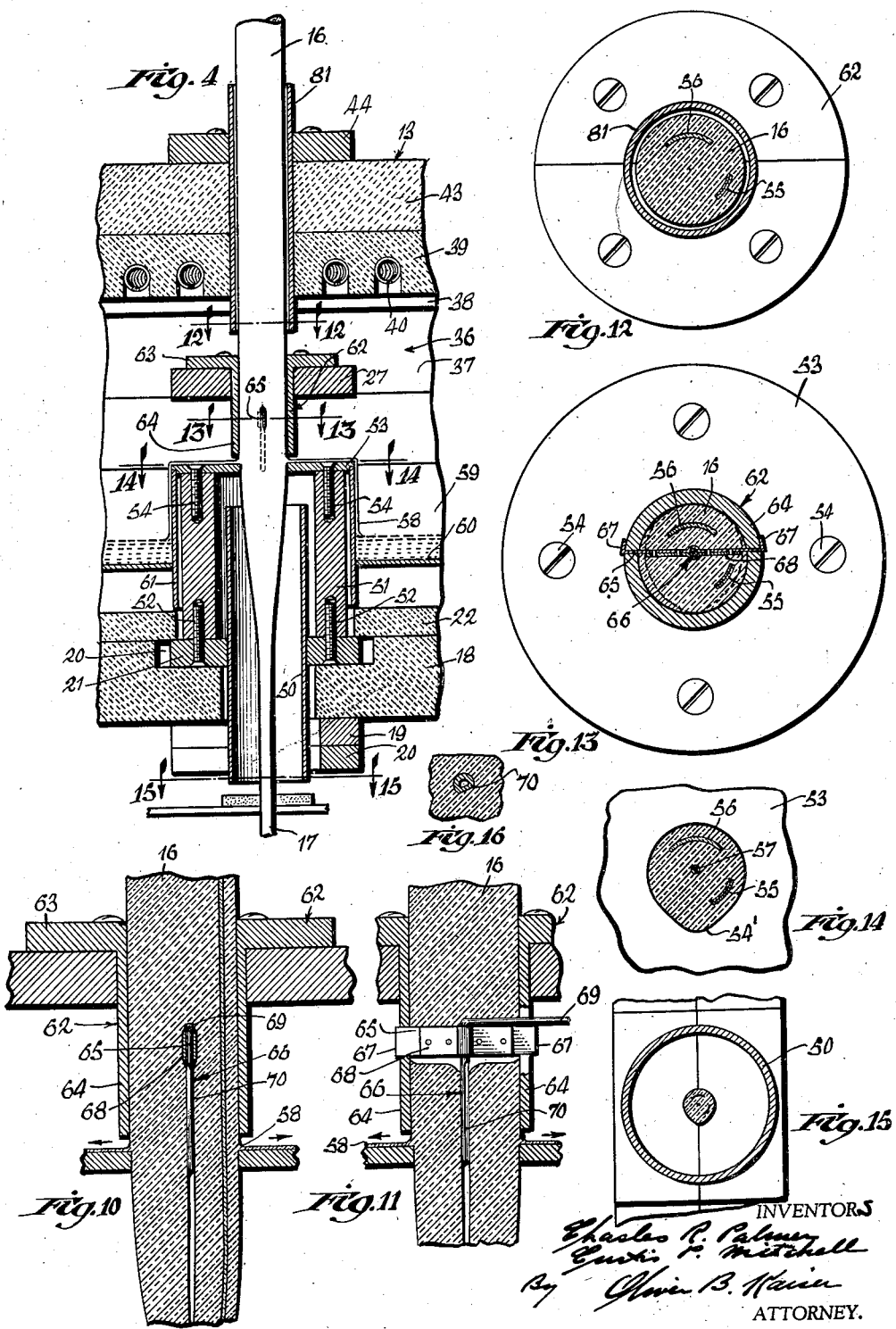

Patented Dec. 29, 1942

2,306,995

UNITED STATES PATENT OFFICE 2,306,995

METHOD OF MAKING CAPILLARY TUBES AND THE LIKE

Charles R. Palmer, Glen Acres, and Curtis P. Mitchell, Cincinnati, Ohio, assignors to The Palmer Company, Norwood, Ohio, a corporation of Ohio Application June 2, 1939, Serial No. 277,048

2 Claims. (Cl. 49—84)

This invention relates to a method for the manufacture of glass tubing, and more particularly to the production of the instrument and the capillary tubing as used in the manufacture of thermometers and the like possessing a small bore, body walls shaped to form a lens, and a definite shape of bore having a surface to give surface to the liquid column within the bore for exposure in relation to a stripe of color on or within the body of the tube, or in relation to the wall surfaces of the body.

It is an object of the invention to provide both a method for the manufacture of thermometer or capillary tubing which is accurate as to both inside and outside dimensions, uniform as to shape or configuration, and standardizing production; and this is also applicable to tubing for other uses in which similar characteristics are required.

Through other methods and with the apparatus heretofore employed, it has been very difficult to manufacture a product having these quantities. Relatively slight variations in the bore cause pronounced inaccuracies which renders it unfit for the use in the manufacture of thermometers, particularly tubing of exceedingly small bore size such as used in clinical thermometers. This necessitated a thermometer manufacturer to reject an exceedingly large portion of stock length of tubing, to obtain therefrom sections satisfactory for thermometer use, as well as the exercise of extreme care in selection which occasioned considerable loss and expense. This is particularly true for the manufacture of high quality and precision instruments.

While it has been difficult to meet these requirements in tubing of the conventional round shape and bore under the methods of manufacture heretofore available, the problems are even more difficult and complex in the manufacture of tubing having specifically configurated bores or exteriors or both, for example, tubing as disclosed in the United States patent to Palmer and Mitchell, Number 1,819,919, dated August 18, 1931, possessing a ductor bore having a relatively flattened wall defining a reflective surface for the liquid which is contained in the duct, while the tubing itself contains or includes a stripe of color material arranged in relation to the reflecting surface of the liquid, so that the light passing from the stripe is reflected by the liquid in the bore to give color visibly to the liquid.

It is requisite in the manufacture of tubing of this type not only that the cross sectional area of the bore of the tubing be uniform and accurate as to size, but also that the bore be of uniform predetermined configuration, and that the color stripe be positioned accurately relative to the bore for proper reflection of light, and the reflecting surface in parallelism with the color stripe for a showing of the rising column fully in color.

In order to comprehend fully the nature of the present invention, the disclosure and description herein are confined to the manufacture of capillary tubing of the type shown in said patent, and primarily for clinical thermometers which it has heretofore been impossible to produce for the manufacture of a higher grade and quantity product on any extended commercial scale. It, however, is to be understood that the method and apparatus can equally, efficiently, and economically be employed for the production of the conventional round type of material and specialized forms and shape, both as to the bore and to the body.

The method of the present invention provides for the manufacture, on a commercial basis, of a capillary tube of high quality for either commercial or clinical thermometers without the large reject necessary under the prevailing methods. The method also enables the reforming of tubing made under the conventional methods now practiced.

This invention provides a method for manufacturing tubing easily and conveniently from a plain or preconfigurated cane of glass or rod material. It therefore is a further object of the invention to produce tubing of high qualtiy, uniform in production and in trueness as to bore and external shape or configuration and absolutely straight.

The invention further provides a simple method for producing tubing from a rod, avoiding the fabrication of tubing from a reservoir or supply of molten glass, and the difficulties which are inherently attendant to the maintenance of the supply.

Briefly, the process of the present invention is predicated upon the principle of reforming a cane or length of glass as distinguished from forming tubing from a reservoir or pool of glass in a molten stage. The cane or length of glass may be solid or it may contain a bore.

By the methods heretofore employed for making capillary tubing characteristic of the tubing disclosed in the aforesaid patent, or tubing having a definite cross sectional shape, a bore of definite shape and definitely located, and one or several strips or stripes of contrasting glass definitely located with relation to the bore, it has not been feasible to continue or maintain the symmetry of the various elements as to their location, one to another, and particularly when drawing the tubing to a reduced degree required for clinical thermometers. The bore and external shape of the body are distorted, and the relative symmetry, one to another, and to the stripe or stripes are disturbed when making the product in a single or unitary continuous operation.

It is therefore a further object of the invention to provide a method of making capillary tubing from a cane or rod having one or a plurality of stripes of contrasting or color glass longitudinally thereof, and give definite cross sectional shape to the bore and body of the tube, and definitely locate the various elements and relatively one to the other uniformly throughout the entire length, and drawing the same to a reduced dimension.

Another object of the present invention is to provide a process of forming tubing from a cane or rod.

The apparatus also provides for supplying air to and through a hollow or tubular mandrel or bore forming die. The invention also provides for skiving the tube at the time of forming its external shape or configuration.

Other features and advantages of the invention will be more fully set forth in a description of the accompanying drawings, illustrating one embodiment of the mechanical features, in which:

Figure 1 is a front elevation of the preferred machine and illustrates a tube in the process of being manufactured from cane.

Figure 2 is a side elevation of the machine.

Figure 3 is a front sectional view of the forming head of the machine. The view is taken on the line 3—3, of Figure 2.

Figure 4 is an enlarged side sectional view of the forming head taken on the line 4—4 of Figure 1 and illustrating the forming operations.

Figure 5 is a fragmentary side elevation of the mechanism for adjusting the exterior forming die.

Figure 6 is a fragmentary plan view of the adjusting mechanism of Figure 5, and is taken on the line 6—6, of Figure 5.

Figure 7 is a cross sectional view taken on line 7—7 of Figure 3 through the heating chamber.

Figure 8 is a top plan view of the guide for the finished tubing.

Figure 9 is a fragmentary side sectional view showing a portion of the forming chamber and the relationship of the tube guide to it taken on the line 9—9 of Figure 3.

Figure 10 is an enlarged sectional view showing a tube in the process of being formed.

Figure 11 is a fragmentary side sectional view similar to Figure 10.

Figure 12 is a sectional plan view taken on the line 12—12 of Figure 4.

Figure 13 is a sectional plan view through the forming elements. This view is taken on the line 13—13 of Figure 4.

Figure 14 is a fragmentary sectional plan view taken on the line 14—14 of Figure 4.

Figure 15 is a sectional plan view taken on the line 15—15 of Figure 4.

Figure 16 is an enlarged sectional plan view showing the bore former submerged in the glass of the tube.

For the purposes of clarity and convenience, the several cooperating portions of the preferred machine are described in the order named.

Heater assembly

The machine comprises a frame which is indicated generally at 1. This frame includes standards 2, 2, one for each side, foot elements 3, 3, for the standards, a central guide rail 4, which is comprised preferably of mating angle iron elements 5, 5, and cross connectors 6, 7, and 8. Guide rail 4 is supported within the standards 2 of the frame by means of brackets 9, 10, and 11, extending forwardly from the cross connectors 6, 7, and 8 respectively.

The continuity of the guide rail 4 is broken intermediate its length for clearing a table 12, upon which the glass heating and forming mechanism is located. The assembly of heating and forming elements is indicated generally at 13. Table 12 is mounted upon bracket arms 14, 14, which extend forwardly from the standards 2, 2, respectively. These brackets also extend rearwardly of the standards, as at 15, for support of the machine upon a wall surface.

Assembly 13 includes a refractory furnace housing. Apertures are provided for admission of a cane or rod to the forming elements and for the discharge of finished tubing to the conveyor. In the drawings the cane or rod is indicated generally at 16, and the finished tubing product at 17.

The general details of the forming assembly are best illustrated in Figures 3 and 4. A disc or plate 18 of suitable refractory or insulating material rests upon a movable crosswise plate 19, which, in turn, slidably rests upon the table 12. Disc 18 is slotted transversely, as at 20, for the reception of a positioning bar 21.

An annular ring 22, of refractory material is carried by the disc 18, to cover the bar 21 located in the slot thereof, and an annular radiant heater 23, having an electrical heating element 24, is carried by the disc 22.

A ring of insulation 25 surrounds the radiant heater 23, and a ring-like support member 26, in turn, surrounds the insulation element 25, both resting upon the disc 22. For the purpose of enclosing the heater chamber within the radiant heater 23, a bar of stainless steel 27 is mounted over the top of it. Bar 27 extends beyond the diameter of the insulation member 25, and a pair of insulation spacers 28, 28, are mounted exteriorly of the member 25 intermediate the bar and the support ring 26 upon which an insulation washer 29 is carried. The washer 29 contains diametrically opposed slots, and clamp lugs 30, 30, one for each side are carried within the slots to extend beyond the diameter of the assembly. Spacers 28, 28, are bored for the reception of screws 31, 31, which extend respectively through the lugs 30, 30, into threaded engagement with the bar 27, with the spacers 28 being bored suitably to clear the heads of the screws.

The lugs 30, 30, respectively, are slotted, as at 32, 32, for attachment to clamp posts 33, 33. These posts are located upon opposite sides of the built-up heater assembly and extend through clearance slots in the crosswise members 19 and 21 into threaded engagement with the table 12. The lugs are fastened to the posts respectively by means of the set screws 34 and 35 to clamp together the various members of the heat chamber.

Above the heat chamber just described, a preheat chamber is provided, as at 36, as follows:

An insulation ring 37 rests upon the uppermost spacer element 28, and is slotted or configurated to fit snugly over plate 27. Another insulation ring 38 rests upon the ring 37, and has a central bore smaller than the latter to provide a dome effect. Radiant heater 39 containing a groove in its lower face in which electric heater element 40 is located rests upon the ring 38 and insulation members 41 and 42 and 43 enclose the heater, the latter member 43 being a top cover plate for the whole assembly. Electrical lead wires for the heater elements 24 and 40 pass through appropriate openings in the refractory elements.

It will be understood that various arrangements or cast forms may be employed in constructing the furnace. The structure employed is a composite array of parts which can be dismantled easily and conveniently should any of the parts become burned out.

The heater and preheater assembly are clamped together by means of the clamp bar 44 which is in connection, at its opposite ends, with the posts 33. The clamp posts are counter-turned to present stud portions 45 and clamp bar 44, at the one end, contains a bore for the reception of one of the studs, and at the other end a slot for engagement with the other stud. Washers 46 are placed over the studs and clamp nuts 47 over the washers. Bracket arms 48, 48, extending from the side rails 2, 2, are also connected to the clamp posts for steadying the assembly. All of the various elements of the heater assembly contain central apertures for passage of the cane through the furnace, and the lower elements also contain apertures indicated generally at 49, 49, for the discharge of excess glass, as will be hereinafter explained.

The formation of the tube

Positioning bar 21, as shown in detail in Figure 4, is bored for supporting a protector thimble 50. A die mounting ring 51 surrounding the thimble and extending above it, also is connected to the plate by means of screws 52.

The exterior shape of the tubing is formed by means of die element 53. This die is mounted upon the ring 51 through screws 54, 54, and the thimble 50 extends upwardly within the ring to a point adjacent the lower surface of the die for protecting the glass being formed by the die against the rapid cooling from extraneous air currents. The upper portion of the ring 51 between the top of the thimble 50 and die 53 is apertured or open for the administration of heat.

The exterior forming die preferably is of platinum or material suitable for resisting the abrading action of the plastic glass which is caused to pass therethrough. Die 53 is preferably of plate form, as shown in the drawings, the interior or bore of that the die being shaped to configurate the exterior of the tube being made to the cross sectional form desired. For instance, it may be shaped as shown in Figure 14, to provide a lens portion 54' upon the glass. Moreover, the die is located upon the ring 51 so that the position of the lens is located properly to the color strip 55, backing color 56 and bore 57, when tubing of the type shown in the Palmer and Mitchell patent is being made.

The size of the bore in the die element 53 also is such that it serves to skive a layer of glass from the surface of the cane being delivered and passes through it. This is shown as at 58. The removal of an outer layer or skin from the glass leaves its surface clear and flawless, otherwise the glass at the outer surface sometimes becomes cloudy and the transparency of the tubing is impaired.

For the reception of such glass removed from the exterior surface of the cane, an annular sump 59 surrounding the die plate within the heat chamber is provided. The sump comprises a tank 60 supported on a skirt 61 surrounding the die plate. If desirous the sump may constitute a trough having divided portions surrounding the plate, and arranged to be withdrawn from the forming head when it becomes full of glass. Otherwise, the tank 60 may contain apertures in the bottom of it from which glass may be drained through the apertures 49, as shown in Figure 3.

Plate 27 extending across the central cavity below the heated dome 36 carries a guide thimble 62 within a bore located in alignment with the die plate 53.

Thimble 62 guides and confines the plastic glass of the cane while a bore is being formed in it, and also provides a support for the mandrel or bore forming elements. The glass, at this stage, is in the plastic condition, and is confined within the guide while the cane above is urged past the bore forming elements. The guide thimble 62 contains an annular flange 63 which is located in abutment with the upper surface of the plate 27, and a depending skirt 64 which extends through the plate, the lower end of the skirt clearing the upper surface of the die plate 53.

A brace 65 extends laterally through the skirt to dependingly support a stationary bore former element or mandrel indicated generally at 66. The brace 65 preferably extends through diametrically opposed slots in the skirt of the thimble 62, and the terminal ends of the brace are bent over, as at 67, to hold it in position. The mandrel is clamped to the brace by means of clip 68 which is riveted thereto. (Figure 11.)

The tubular head 69 of the mandrel 70 extends laterally to lead to the exterior of the furnace for making an air supply connection.

In the preferred structure, the depending tube former 66 terminates adjacent or below the surface of the die 53 forming the exterior of the glass to avoid any distortion of the bore while the glass is pressed or moved through the external shaping die, this however for some bore shapes is not requisite.

The bore former is of tubular form to provide an air duct therethrough, and is of a definite configuration for a corresponding shaping of the bore. A typical configurated type of bore is shown in Figure 16.

A pipe line 72 connects with the head of the mandrel and with a pump 73 for supplying air under negative or positive pressure. This line contains a vent 75 which is opened when the pump is not to be used.

In the instance shown, with the brace or strut disposed crosswise the glass in order to pass the strut is bisected thereby, which, however, immediately upon leaving the strut, welds or unites to completely envelop the mandrel or bore forming die. This however is merely incidental to the method employed for supporting the mandrel. It is essential that the mandrel be rigidly supported and held to its setting, and maintained plumb, for otherwise it would tend to alter the definite shape of bore or shift in its location.

Adjustment of exterior and bore forming die positions

Plate 21, upon which the die 53 is mounted, is adjustably movable for predetermining the relative position of the bore to the exterior configuration established by the die plate. For this purpose, at each end of the plate 21 an adjustment mechanism is provided. The plate 21 is slotted, as previously described, for clearing the clamp posts 33 and the plate contains, at one end or both, a lug 76. Each lug rotatably carries an adjusting screw 77. Each screw is in threaded engagement with a lug 78 mounted upon plate 19 which is carried upon the table 12.

The table itself carries lugs 79 adjacent each end of the plate 19 and longitudinal adjusting screws 80 are carried in the endwise lugs 79 for abutment with the ends of the plate 19. Complementary rotation of the adjusting screws 80, at opposite ends of the bar 19, moves the die 53 in crosswise direction, while rotation of the screws 77 provides for adjustment of the die backwardly and forwardly of the machine. The bore former is stationary in position and the formation of the bore is independent of the formation of the exterior. Through movement of the die 53 relative to the bore former, the bore occupies a given position wholly independent of the location or configuration of the exterior of the finished tubing.

Delivery of cane

A sleeve 81 extends through the clamp and cover plates 44 and 43 and the furnace 39, to guide the cane 16 to the thimble 62. For the purpose of delivering cane through the sleeve 81 a cane carriage and chuck or movable head stock is provided. This carriage is slidably mounted upon the guide rail 4.

The carriage comprises a plate 82 carrying and journaling rollers 83 on its rear side, arranged in pairs to ride the oppositely projecting flanges 5 of the guide or T rail 4. A clamp screw 86, having a knob 87 at one end thereof, extends through and is supported by a pair of relatively spaced lugs 88 projecting from the forward side of the plate 82. The clamp screw is provided with right and left hand threads in respective threaded engagement with a pair of opposing jaws 90 disposed intermediate of the lugs. The jaws are slidably mounted upon guide pins 89 having their outer ends engaged into and supported by the lugs 88. The lower or outer ends of the jaws extend beyond the carriage and are arranged to grip and clamp an end of a cane of glass therebetween. The carriage, at its upper end, carries a pair of weights 94 respectively mounted upon the opposite ends of a cross bar 95 fixed to the carriage base plate 82.

As illustrated in Figure 1, the machine is equipped with an annunciator for sounding an alarm for cane replenishing, the alarm mechanism comprising a mercury switch 96 mounted upon an arm 97 pivoted at 98 to one of the side rails 2 and counter-weighted by a weight 99. The terminals of the mercury switch are in flexible connection with electric circuit lines 100, 101, the mercury switch controlling the circuit to a buzzer 102 connected in series with one of the electric circuit lines. The arm 97, at its opposite end, is in connection with a vertical control rod 103 traversing a lug 104 extended from the carriage, and also traverses an upper guide bracket 105 mounted upon a cross support 106 fixed to the guide rail 4 and to an extension piece 107 fixed to a side rail 2. The control rod 103 carries an adjustable stop dog 108 for engagement with the control lug 104 of the carriage.

Conveyor for drawing tubing and governor

Beneath the forming assembly a conveyor for drawing and carrying finished tubing is provided. This mechanism also includes a governor by which the rate of issuance of the tubing is controlled.

Briefly, this mechanism comprises a plurality of rolls arranged frictionally to contact the finished tubing. Since the tubing is in relatively plastic condition as it emerges from the forming step, any pull or draw upon it will cause it to become elongated and proportionately reduced in cross-sectional area.

The reduction of size of the reformed tube takes place preferably within the thimble 50, as shown best in Figure 4, while the glass is still sufficiently plastic, the atmosphere within the thimble being sufficiently heated to avoid rapid chilling of the glass.

To support the tube laterally just beneath the thimble, particularly during start-up of the machine, a pair of guide elements forming a passageway is provided. The guiding mechanism comprises a pair of arms 109, pivotally supported upon a plate 110 and containing complementary slots 111 forming a tube passageway. Springs 112 and 113 are employed for holding the guide arms 109 in abutment with one another.

The guide arrangement is adjustable for accommodation of adjustments in the position of the die 53. For this purpose the plate 110 is slidably mounted upon a grooved cross slide plate 114 which carries lugs 115, 115, at its opposite ends for the reception of adjusting clamp screws 116, 116. The screws are in abutment with the edges of the plate 110 and are provided for crosswise adjustment of it. The cross slide plate 114, in turn, is mounted for guided sliding movement in a transverse direction upon a plate 117, the latter being mounted stationarily upon a bracket piece 118 extending from the center rail 4.

At one side the plate 114 carries a lug 119 which extends below the plate 117. The lug threadedly carries an adjusting screw 120 having a knob 121. The screw is journalled in a lug 122 depending from the slide plate 117, so that when the screw is turned the plate is moved. Refractory elements 123, 123, are carried upon the arms 109 to form the guideway for the glass. Refractory guide rollers may be employed in place of the stationary refractory guide elements.

The conveyor is made up of pairs of rolls 123ª, 124, 125, and 126. The rolls of these pairs are rotatably journalled upon respective journal plates 127 and 128. The plates are pivoted to swing sidewisely on pivot studs 129, 130, extending from a back plate 131.

The back plate 131 is sustained by angle brackets 134, 135 from the central guide rail 4.

The studs 129, 130 journal gearing driven by a sprocket chain 144 in driving connection with a speed reducer 143 of an electric motor 145 mounted upon a bracket 146 fixed to and laterally extending from the guide rail 4.

The tube conveying rolls 123ª, 124, 125 and 126 are in driven connection with the transmission gearing journaled upon the studs 129, 130 and, therefore, are positively rotated in an appropriate direction and at relative uniform speed for appropriately advancing the glass tube. The rolls of each pair of rolls 123a, etc., are held into transmitting contact with the advancing glass tube by a movable plate 157 having a pair of fingers at its lower end respectively bearing upon a hub of the rolls to urge them toward each other. The plate 157 is pressed against the hubs of the rolls by a spring having one end fixed to a bar 161 extending longitudinally along the plurality of rolls for unitary control. Each plate 157 has a slot in one side thereof for the reception of a finger 164a laterally extending from the bar 161. The lower end of the bar 161 is in operative engagement with a latch lever 165 pivotally mounted on the plate 128. Upon actuating the lever 165 to raise the bar 161, the rolls will be relieved of their transmitting contact with the advancing glass tube.

A lower bracket 169 is clamped by means of lugs 169ᵃ to the central rail 4 at a point adjacent the lower portion of the conveyor assembly, to furnish additional support for the carriage mechanism, while bracket support 170 is connected to the bracket 169 for support of the glass tube at a position convenient for cutting it off as it emerges from the machine. A support piece is extended from the back plate for supporting the lower portions of the mounting plates 127 and 128.

The drawing mechanism permits a change of speed of the glass drawing during the work without stopping the machine. The rate of roller rotation and the distance of the said starting rollers of the series from the extrusion die governs the final and finished size of the tube, and this is maintained by the series of roller sets positively and uniformly feeding the tube in an absolute straight or perpendicular line until the glass is sufficiently set or cooled.

Operation of machine

In performing the method of fabricating, tubes by the use of the above described apparatus, the temperature of the furnace is brought to a proper degree. A cane or rod of the glass 16 is placed and lowered within the entrance guide thimbles until it rests upon the cross strut sustaining the bore forming tool. The other end of the cane is inserted within the chuck jaws 90, 90, of the translatable head stock, and adjusted axially to appropriately locate the color stripe or strip relative to a phase of the configuration of the bore forming tool. With the fusion of the glass under the definite feeding pressure of the head stock, it moves downwardly about the bore forming tool. The tube continues its downward passage through the extrusion and skiving die 53 forming the exterior configuration and emerges into the thimble 50.

Under the influence of the drawing tension established by the rolls, the tube is drawn from the forming elements and emerges in a straight, continuous length.

The apparatus is intended to be employed in conjunction with a suitable controller for regulating the temperature in the furnaces. The rate of rotation of the draw rolls primarily controls the degree of draw or reduction in size of the tubing emerging from the die 53. With uniform temperature and uniform rate of drawing the finished tubing is uniform, true, and even, regardless of the particular size to which it has been drawn.

In a commercial practice for producing clinical thermometer tubing, the rod or cane is about ½ to ⅝ of an inch in diameter, and from 3 to 5 feet in length. In making thermometer tubing having the characteristics as set forth in the aforesaid patent, the bore has a flattened surface, and is so inclined with respect to the reading face or lens of the tubing that a color stripe parallels and is so oriented to the flattened surface of the bore, that a reflective and thermally expansive fluid rising in the bore will reflect the color through the reading face.

Thus, for a mercury thermometer, the rising column of mercury is in simulation of color, facilitating in its reading. The bore forming tool of appropriate cross sectional shape and possessing a flattened surface is accurately set to incline the flattened surface with respect to the reading face or lens portion of the tube produced by the extrusion die. Likewise the setting of the rod and grippingly holding the same in the head stock is made to bring the color stripe parallel and so oriented to the flattened surface of the bore produced by the bore forming tool to obtain the effect as above related.

By the proper fusion of the lower section of the rod within the furnace and under the pressure of the descending bead stock, the glass will traverse and surround the stationary bore forming tool, producing a corresponding shape of bore therein. The fusion of the rod progressively continues with the advance of the rod and illustratively for the composition of glass used for thermostat tubing provides for a furnace temperature of 1400° F. to 1500° F. and a feeding rate of one inch per minute. The glass is then forced through the extrusion die for the desired external shaping. The die in shaping also skives off the outer surface which materially improves the clearness of the glass. Likewise, the refusion and reforming of a glass cane or rod produces a product more pure and free from striae and bubbles, a quality highly desirable for capillary tubing.

The formed tube as extruded from the extrusion die is drawn by the drawing apparatus to give it the desired cross sectional dimension, thus materially decreased in size. Air pressure is supplied through the bore forming tool to prevent collapse while drawn. The rate of tube or rod feed into the furnace, the furnace temperature and rate of tube drawing are regulatable and under positive control, thereby standardizing production and enabling the manufacture of a product of highest quality and accuracy on a commercial scale, which for capillary tubing for clinical thermometers, having a very minute bore has heretofore been impossible, particularly for the type of tube preferably herein exemplified.

Having described our invention, we claim:

1. The method of making a capillary tube or the like, consisting in continuously feeding a stem of glass through a vertical jacket located in a heating zone and over a bore forming tool disposed longitudinally of and within said jacket, whereby the glass is rendered plastic and a bore is formed in said stem, continuously passing said bored stem, and while the glass is still plastic, through a contour shaping and skiving die located below and in spaced relation to said jacket, whereby a surface portion of the glass of said bored stem is skived off by said die and the bored stem is contoured, and then drawing the bored stem at a rate to reduce it to a determined size.

2. The method of making a capillary tube or the like, consisting in continuously feeding a stem of glass through a vertical jacket located in a heating zone and over a bore forming tool disposed longitudinally of and within said jacket, whereby the glass is rendered plastic and a bore is formed in said stem, continuously passing said bored stem, and while the glass is still plastic, through a contour shaping and skiving die located below and in spaced relation to said jacket, whereby a surface portion of the glass of said bored stem is skived off by said die and the bored stem is contoured.

CHARLES R. PALMER.
CURTIS P. MITCHELL.